United States Patent [19]
Sivilotti et al.

[11] Patent Number: 5,514,359
[45] Date of Patent: May 7, 1996

[54] PROCESS FOR MAKING ANHYDROUS MAGNESIUM CHLORIDE

[75] Inventors: Olivo G. Sivilotti; Jean V. Sang; Réjean J. R. Lemay, all of Kingston, Canada

[73] Assignee: Alcan International Limited, Montreal, Canada

[21] Appl. No.: 359,857

[22] Filed: Dec. 20, 1994

Related U.S. Application Data

[63] Continuation of Ser. No. 43,184, Apr. 6, 1993, abandoned.

[51] Int. Cl.[6] ...................................................... C01F 5/34
[52] U.S. Cl. ........................... 423/498; 423/162; 423/163
[58] Field of Search .................................. 423/498, 162, 423/163; 23/304

[56] References Cited

U.S. PATENT DOCUMENTS

| | | | |
|---|---|---|---|
| 2,381,994 | 8/1945 | Belchetz | 423/498 |
| 2,381,995 | 8/1945 | Belchetz | 423/498 |
| 3,092,450 | 6/1963 | Christensen et al. | 423/498 |
| 3,341,282 | 9/1967 | Kimberlin, Jr. et al. | 423/498 |
| 3,347,626 | 10/1967 | Nightingale, Jr. | 423/498 |
| 3,352,634 | 11/1967 | Buchmann | 423/498 |
| 3,357,800 | 12/1967 | Gaska | 23/304 |
| 3,387,920 | 6/1968 | Nightingale, Jr. | 423/498 |
| 3,966,888 | 6/1976 | Braithwaite et al. | 423/498 |
| 3,983,224 | 9/1976 | Allain | 423/498 |
| 4,056,599 | 11/1977 | Fox, III et al. | 423/497 |
| 4,105,747 | 8/1978 | Eisele et al. | 423/493 |
| 4,228,144 | 10/1980 | Kono et al. | 423/498 |
| 4,248,838 | 2/1981 | Allain et al. | 428/498 |

FOREIGN PATENT DOCUMENTS 63-162527  7/1988  Japan ........................................ 23/304

Primary Examiner—Gary P. Straub
Assistant Examiner—N. M. Nguyen
Attorney, Agent, or Firm—Cooper & Dunham

[57] ABSTRACT

In a process for producing anhydrous magnesium chloride, the following combination of steps: drying impure salt containing hydrated magnesium chloride; establishing a solution of the hydrated magnesium chloride; removing insoluble impurities; reacting the solution of hydrated magnesium chloride at substantially ambient temperature and pressure by feeding it into an ammonia saturated very low boiling point alcohol solution and in the presence of ammonium chloride while maintaining the last-mentioned solution saturated in ammonia thereby to form a precipitate of ammoniated magnesium chloride; separating the precipitate and heating it to obtain anhydrous $MgCl_2$ and ammonia for recycling.

18 Claims, 3 Drawing Sheets

5,514,359

PROCESS FOR MAKING ANHYDROUS MAGNESIUM CHLORIDE

This is a Continuation of application Ser. No. 043,184, filed Apr. 6, 1993 now abandoned.

BACKGROUND OF THE INVENTION

This invention relates to processes for making anhydrous magnesium chloride.

One important use of the product of the present process is in the electrolytic production of magnesium metal from magnesium chloride, for which anhydrous magnesium chloride of high purity is required. Magnesium chloride occurs in natural and artificial brines, and in ores such as carnallite and bischofite, in a polyhydrated form, e.g. as hexahydrate. Suitable thermal techniques are known for removing some of this water of hydration, to achieve the dihydrate; but procedures heretofore employed to effect the requisite virtually complete removal of water have been attended with various difficulties.

It is known that ammoniated magnesium chloride compounds are usable as material for producing anhydrous magnesium chloride. Ammoniation is often carried out under anhydrous conditions as done for example in U.S. Pat. No. 3,966,888. More particularly, U.S. Pat. No. 3,966,888 describes a process in which hydrated forms of $MgCl_2$ are dissolved in ethylene glycol. The water is then distilled off from this solution and after subsequent cooling to a temperature between 15° and 50° C., the anhydrous solution is reacted with gaseous ammonia to form magnesium chloride hexammoniate, $MgCl_2.6NH_3$, which is washed with anhydrous methanol and then decomposed to anhydrous magnesium chloride. Other processes where the ammoniation is carried out under anhydrous conditions have been proposed. For example, in U.S. Pat. No. 2,381,994 a hydrous form of magnesium chloride is dissolved in monohydroxy aliphatic alcohols having boiling points between 100° and 180° C., and is precipitated as $MgCl_2.6NH_3$ after the removal of water by distillation. In the process of U.S. Pat. No. 3,352,634 partially dehydrated $MgCl_2$ is dissolved in a an alcohol containing from 4 to 10 carbon atoms; the solution is then subjected to azeotropic drying to give a bone dry solution of $MgCl_2$ in the alcohol, and thereafter treated with ammonia to precipitate $MgCl_2.6NH_3$. The problem with such schemes is that a second alcohol, of low boiling point temperature such as methanol, is required for the washing of the ammoniate precipitate since, otherwise, the high boiling point alcohol decomposes, leaving a carbon residue. Other common problems are the very high consumption of ammonia, with up to 30 moles $NH_3$ required to produce 1 mole of anhydrous $MgCl_2$ and the low precipitation yields of $MgCl_2.6NH_3$ due to the high solubility of the ammoniate compound in the high boiling point alcohol.

Ammoniation has been also carried out in aqueous reacting media. For example, U.S. Pat. No. 3,092,450 discloses a process for producing $MgCl_2.6NH_3$ by adding an aqueous solution of magnesium chloride and ammonium chloride to an aqueous solution containing ammonia, at low temperatures between −20° and 10° C., so as to allow magnesium chloride hexammoniate to precipitate. Another variant of the process, described in U.S. Pat. No. 4,228,144, proposes to carry the ammoniation reaction at temperatures varying between −50° and 0° C. The problem with such schemes is that the reaction yields are relatively low, i.e 60–70%. Therefore, large amounts of unreacted magnesium chloride in reaction mixture have to be recovered and reused. Also, very high amounts of ammonia are required, i.e. 20–30 moles of $NH_3$ per mole of magnesium chloride produced. Finally, the reaction has to be carried out at low temperatures, i.e. typically −50° C. to 0° C. in the case of U.S. Pat. No. 4,228,144. Since the ammoniation reaction is an exothermic reaction, the operation at low temperatures requires a large amount of refrigeration which makes the process expensive. To partially overcome this difficulty, the process described in U.S. Pat. No. 3,092,450 proposes to carry out part of the ammoniation step at higher temperatures but this requires the use of pressures substantially above atmospheric.

A variety of processes for purifying magnesium chloride values have also been proposed. U.S. Pat. No. 3,357,800 describes a process in which impure $MgCl_2$ containing alkali metal halides is dissolved in alcohols, preferably methanol, and after filtration to remove insoluble impurities, magnesium chloride hydrate is recovered by evaporation of the solvent. In the process of U.S. Pat. No. 4,056,599, carnallite, $MgCl_2.KCl.6H_2O$, is dissolved in methanol to make a solution from which the insoluble impurities and KCl are separated; thereafter the solution is heated to distil off the solvent, leaving behind an aqueous solution of pure $MgCl_2$.

SUMMARY OF THE INVENTION

The present invention broadly contemplates the provision of a process for obtaining anhydrous magnesium chloride, as a product, from a raw material containing hydrated magnesium chloride, comprising establishing a solution of hydrated magnesium chloride; reacting this solution at substantially ambient temperature and pressure by feeding it into an ammonia saturated very low boiling point alcohol solution and in the presence of ammonium chloride, while maintaining the last-mentioned solution saturated with ammonia, thereby to form a precipitate of ammoniated magnesium chloride; separating the precipitate of ammoniated magnesium chloride from the last-mentioned solution; and decomposing the separated precipitate into anhydrous magnesium chloride, as the product, and ammonia.

The term "very low boiling point alcohol," as used herein, means alcohol selected from the group consisting of methanol, ethanol, other alcohols having a boiling point (at standard atmospheric pressure) of 100° or less, and mixtures of two or more thereof. For convenience, such alcohol will be exemplified (in the detailed description of preferred embodiments) by methanol, which is currently the alcohol most preferred for the practice of the invention, but it is to be understood that where methanol is so mentioned, other very low boiling point alcohol as defined above can be used in its place.

Preferably, the alcohol employed as the solvent is methanol or ethanol, methanol being (as stated) currently especially preferred. It is also preferred that the substantially ambient temperature (at which the ammoniation step is performed) be between about 10° and about 60° C.

The initial solution of hydrated magnesium chloride (which is fed into the ammonia-saturated very low boiling point alcohol solution) may be established in water, or (more preferably in some instances when impure magnesium chloride is available in solid form) in mixtures of water and the very low boiling point alcohol.

In one embodiment of the invention, prior to being dissolved in the very low boiling point alcohol, the hydrated magnesium chloride is given a preliminary drying, with removal of sufficient water of hydration to provide the chloride in the form of a solid $nH_2O$ hydrate for dissolution in the alcohol, where n has a value less than 6. This magnesium chloride feed may contain impurities, e.g. halides such as KCl and NaCl from the raw material source of the magnesium chloride or products of hydrolysis such as MgO and MgOHCl that are insoluble in the very low boiling point alcohol; if so, these insoluble impurities are separated and removed from the solution before the ammoniation step.

However, predrying is not necessary and solid hexahydrates and even prepurified liquid brines may be used. In the latter case, the addition of very low boiling point alcohol to the brine is not required, if there is sufficient very low boiling point alcohol already present in the reaction solution (i.e., in the ammonia-saturated solution in which, in the presence of ammonium chloride, the hydrated magnesium chloride is reacted with ammonia to form a precipitate of ammoniated magnesium chloride, e.g., $MgCl_2.6NH_3$).

Particularly important features of the invention, in combination, are the dissolution of the impure $MgCl_2$ in a very low boiling point alcohol, and the ammoniation of the very low boiling point alcohol solution at temperatures between 10° and 60° C. to produce the $MgCl_2.6NH_3$. By performing the ammoniation reaction in very low boiling point alcohol instead of water, the process of the present invention avoids the main drawbacks of previous aqueous processes: precipitation yields are very high, i.e. above 90% and if desired above 99%, due to the lower solubility of $MgCl_2.6NH_3$ in ammonia saturated very low boiling point alcohol compared to that in ammonia saturated water; the amount of ammonia required is much lower, i.e. typically 10 to 15 moles $NH_3$ per mole of magnesium chloride produced; and the process can be carried out at significantly higher reaction temperatures, i.e. 10° to 60° C. at substantially ambient pressures.

Further features and advantages of the invention will be apparent from the detailed description hereinbelow set forth, together with the accompanying drawings.

DETAILED DESCRIPTION

The invention will be described as embodied in a process for the preparation of anhydrous magnesium chloride, suitable for use in the electrolytic production of magnesium metal, in which hydrated magnesium chloride and ammonium chloride are added to an ammonia-saturated methanol solution to form magnesium chloride hexammoniate. The ammoniated magnesium chloride solid compound is separated, washed with methanol saturated with ammonia and decomposed to provide anhydrous magnesium chloride of very low MgO content.

In the reaction of magnesium chloride with ammonia in the presence of water two competing reactions can occur:

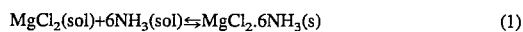

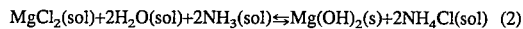

In the process of this invention, the undesirable reaction (2) which leads to the formation of $Mg(OH)_2$, and hence of MgO upon subsequent calcining, is avoided by (1) minimizing the amount of water by carrying the reaction in methanol, instead of water, and (2) maintaining a minimum ratio of ammonium chloride to the amount of water present in the methanol.

Natural or artificial $MgCl_2$ brines, bischofite ($MgCl_2.6H_2O$), carnallite ($KCl.MgCl_2.6H_2O$) or ammonium carnallite ($NH_4Cl.MgCl_2.6H_2O$) or any other magnesium chloride containing material may be used as raw materials for the process of this invention, or, in order to minimize the input of water to the process, the starting material (brine, bischofite or carnallite) is pretreated to remove some of the water from the magnesium chloride polyhydrate by known thermal processes, and to use the resultant magnesium chloride n.hydrate as feed to the process, where n is less than 6.

Figure 1:
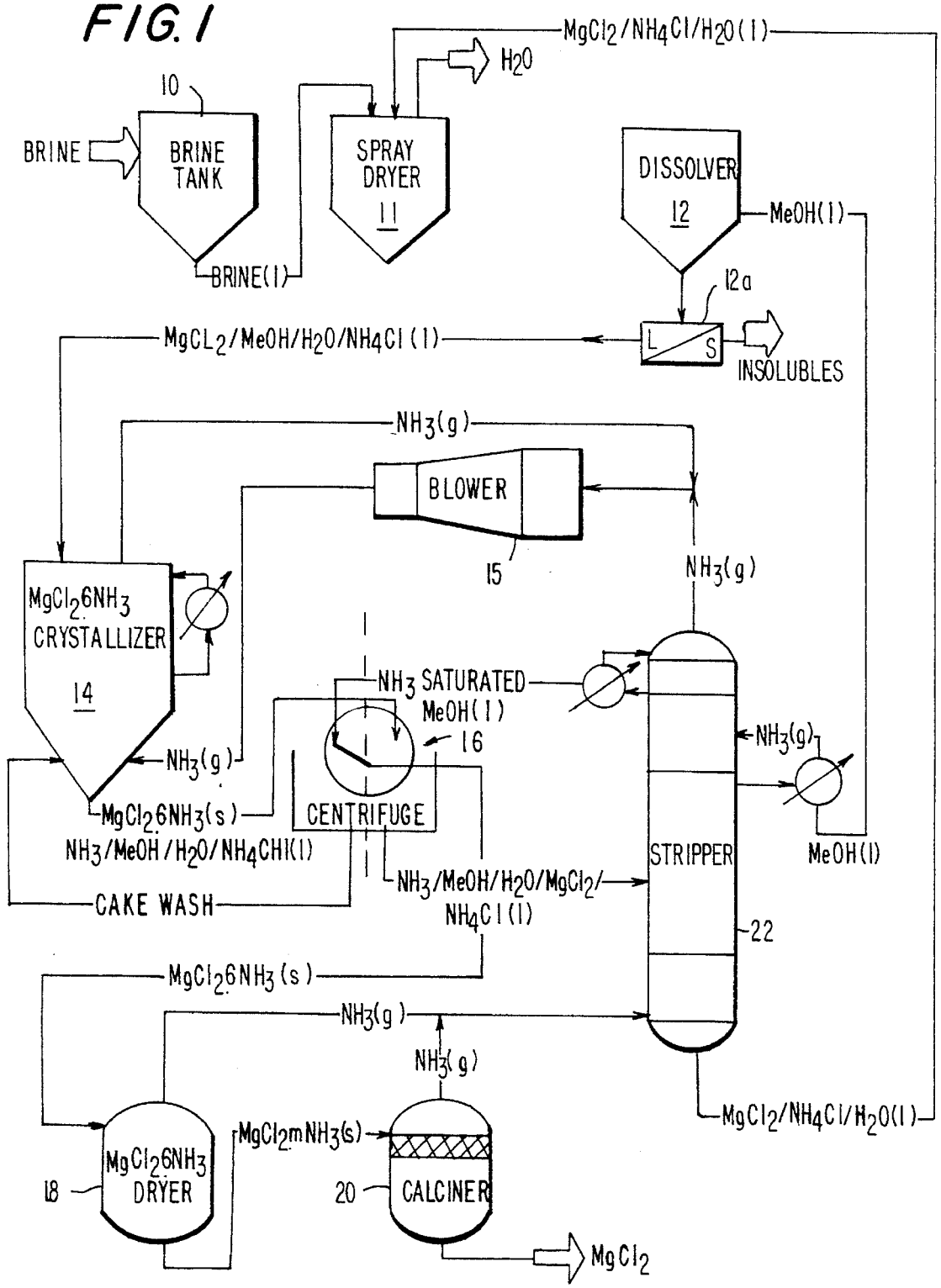
FIG. 1 is a flow diagram illustrating one embodiment of the process of the invention.

The present invention may be more fully understood by reference to an illustrative embodiment represented by the process flow diagram shown in FIG. 1. $MgCl_2$ brine from a brine tank 10 and recycled $NH_4Cl$ solution are first partially dehydrated in a spray dryer 11 to a moisture content e.g. corresponding to the dihydrate, $MgCl_2.2H_2O$. The spray dried product is then dissolved in methanol in a dissolver 12. The resulting alcoholate solution is fed to a crystallizer 14 in which a high saturation of ammonia is continuously maintained with the aid of a blower 15. This crystallizer is designed to provide high agitation able to disperse the incoming alcoholate solution rapidly into the ammoniate solution to avoid any local undersaturation with respect to ammonia which would result in $Mg(OH)_2$ formation. As mentioned also in U.S. Pat. No. 4,228,144, it is preferable to disperse the feed solution uniformly in fine droplets into the reacting solution by the use of feeding nozzles.

After centrifuging (in centrifuge 16) and washing, the ammoniate compound formed is dried in dryer 18 and decomposed in calciner 20 into product anhydrous $MgCl_2$ and $NH_3$ gas for recycling. The remaining alcoholate solution contains methanol, ammonium salt, ammonia and water but only small amounts of unreacted magnesium chloride. The methanol and the ammonia are separated from the water and ammonium salt in a multipurpose distillation unit (stripper 22) and recycled to the process.

In this embodiment of the invention, the feed of hydrated magnesium chloride may be accompanied by impurities insoluble in methanol. As stated above, this feed is combined, in spray dryer 11, with a liquid recycle stream containing ammonium chloride together with water and some magnesium chloride values. The water is driven off in dryer 11, and the resultant dried magnesium chloride dihydrate (together with its accompanying impurities) and the ammonium chloride are delivered from the dryer to methanol in the dissolver 12, thereby to form a solution of magnesium chloride dihydrate and ammonium chloride in the dissolver. The impurities insoluble in methanol are separated and removed from this solution, i.e., from the discharge from the dissolver, as indicated by solid-liquid separation step 12a.

The impurity-free solution is delivered from the dissolver to the crystallizer 14, which in steady-state operation is filled with the reacting solution, and to which (as also stated above) gaseous ammonia is continuously supplied by blower 15 to maintain the solution saturated with ammonia. Magnesium chloride hexammoniate precipitates from the solution in the crystallizer, in accordance with reaction (1) above. The water of hydration is, of course, also present in the solution, but its reaction with magnesium values to form magnesium hydroxide is suppressed by the presence of the ammonium chloride.

From the bottom of the crystallizer, the magnesium chloride hexammoniate is carried in a liquid flow of the methanol (now containing dissolved ammonia, water, and ammonium chloride) from the crystallizer to the centrifuge 16, where it is separated from the latter flow as a cake and washed with ammonia-saturated methanol. The cake wash (mainly ammonia-saturated methanol) is recycled to the crystallizer, while the aforementioned liquid flow of methanol (also containing most of the water, the ammonium chloride and small magnesium chloride values) passes from the centrifuge to the stripper 22. The washed hexammoniate cake is delivered to the dryer 18, in which all of the residual methanol and part of the ammonia are removed with heat, and thence (e.g. as diammoniate) passes to the calciner 20 for thermal decomposition into anhydrous magnesium chloride product and ammonia gas.

In the dryer 18 and the calciner some methanol and mainly ammonia gas is evolved. This gas is delivered to the stripper, which separates the liquid and gas supplied thereto into a gaseous ammonia stream, which is recycled to the blower 15 (along with excess ammonia from the top of the crystallizer); a liquid, ammonia-saturated methanol stream, which is recycled to the centrifuge 16 to provide cake wash solution; a liquid methanol stream, which is recycled to the dissolver 12; and a liquid magnesium chloride—ammonium chloride—water stream, which is recycled to the spray dryer 11 for mixture with fresh hydrated magnesium chloride feed from brine tank 10. The water of hydration from the hydrated feed (retained in the process stream upon ammoniation of the magnesium chloride in the crystallizer) is thus ultimately driven off from the spray dryer 11, while the ammonia, ammonium chloride and methanol are continuously recycled and reused.

It will be seen that, in this process, operating in a continuous manner, the feed solution of magnesium chloride dihydrate and ammonium chloride in methanol from the dissolver 12 is, in effect, introduced in the crystallizer 14 to an ammonia-saturated methanol solution (containing ammonium chloride continuously supplied) for ammoniation therein, the latter solution being replenished not only by fresh inflow of feed solution but also by recycled cake wash solution from the centrifuge. The ammoniation in the crystallizer is performed at substantially ambient temperature and pressure, a preferred temperature range being about 10°–40° C.

Figure 2:
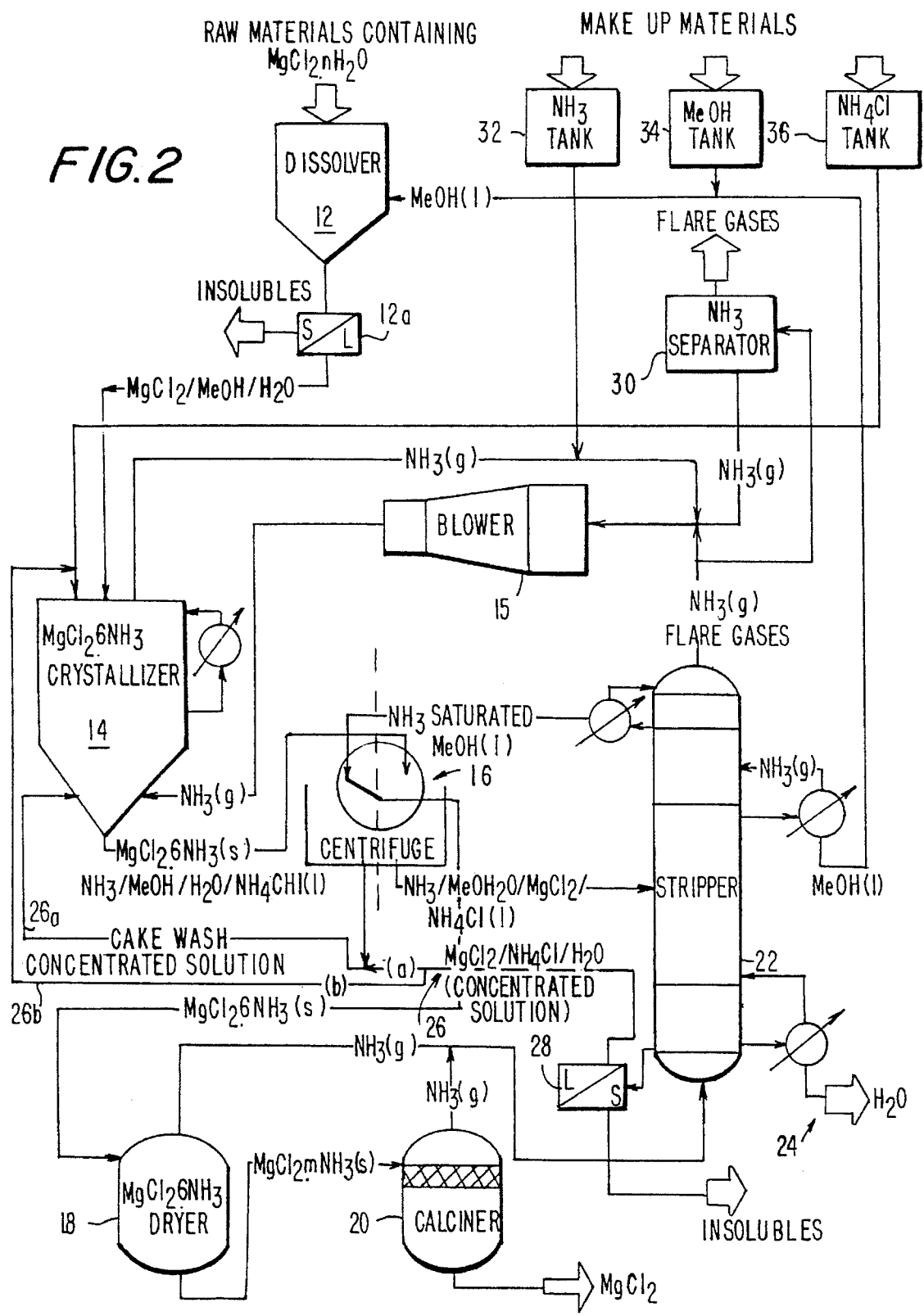
FIG. 2 is a flow diagram illustrating a second embodiment of the process of the invention.
Figure 3:
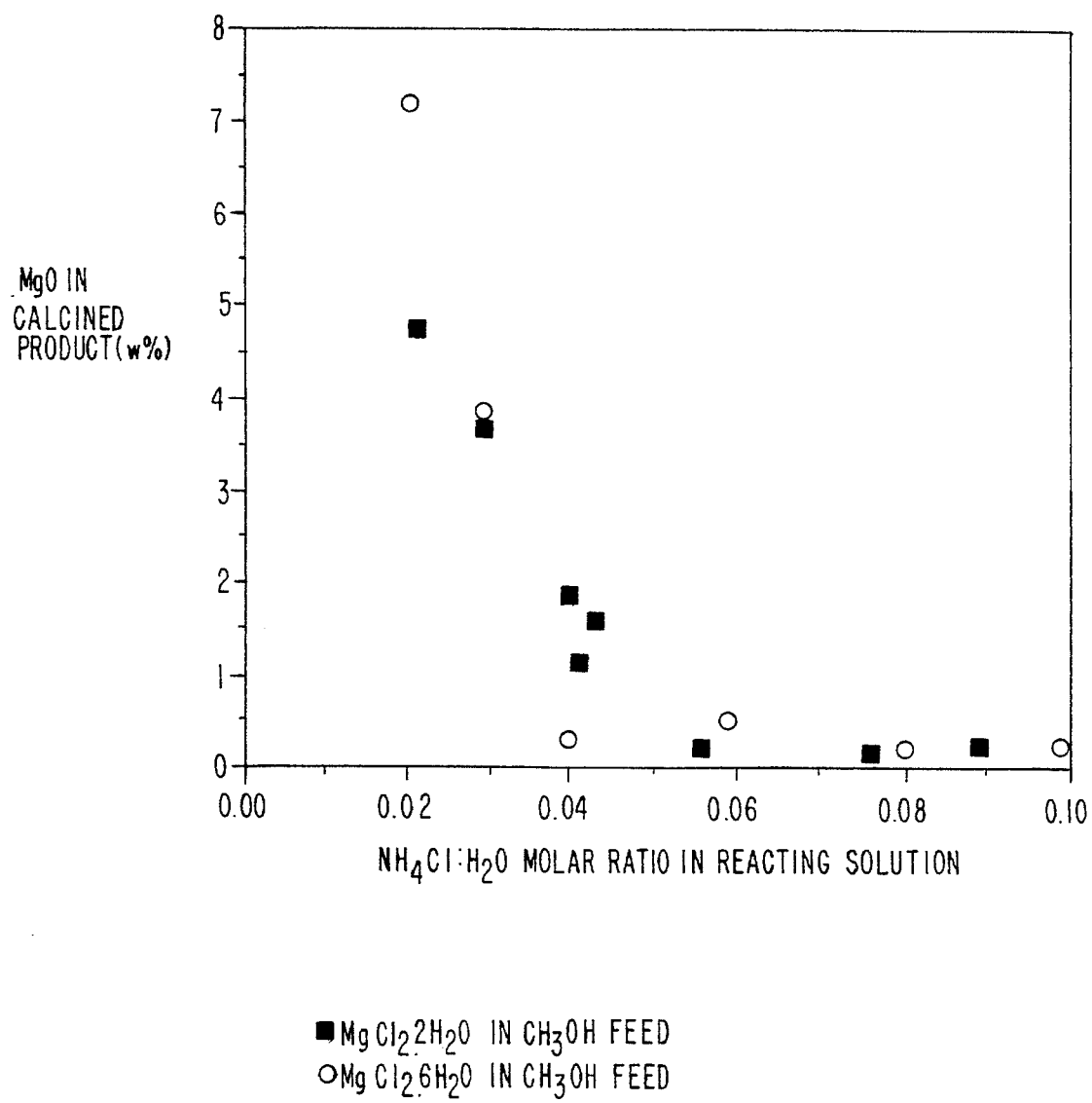
FIG. 3 is a graph showing the relationship between the weight percent of MgO in the calcined product of the process and the $NH_4Cl:H_2O$ molar ratio in the reacting solution.

An alternative embodiment of the invention is represented by the modified process flow diagram of FIG. 2, in which system components corresponding to those of FIG. 1 are identified by like reference numerals. The embodiment of FIG. 2 is conveniently applicable, for example, to cases where the raw material arrives on site in solid form (so that the spray dryer is not part of the plant). The modification consists of extracting the water in the recycle loop (as indicated at 24) and of providing the required amount of $NH_4Cl$ to the reaction solution in the crystallizer 14 by adding it (as indicated at 26) to the centrifuge cake wash solution which is returned to the crystallizer. In this case, the ammonium chloride adding process can be carried out by concentrating the water-salt solution and by mixing it with the centrifuge cake wash methanol-ammonia solution, designated as route 26a; or directly into the crystallizer 14, designated as route 26b; or using both routes 26a and 26b depending on the total amount of ammonium chloride required to prevent the unwanted formation of $Mg(OH)_2$ and to obtain a high yield of $MgCl_2.6NH_3$, while avoiding excessive concentrations of $NH_4Cl$. This avoids oversaturating, leading to precipitation of solid $NH_4Cl$ anywhere in the circuit, this avoids having to handle solid $NH_4Cl$; however, the additional water carried back to the crystallizer by the concentrated solution absorbs additional ammonia which needs to be subsequently evaporated, adding to the heat requirements of the process. Therefore the method of handling the $NH_4Cl$ in the recycle loop needs to be selected for each case, to minimize the total cost of the process. Likewise the input of water to the process per mole of $MgCl_2$ in the dissolver 12 can be selected within the range of 1 to 10 moles or more, depending on capital and operating cost parameters applicable to each installation, provided that the $NH_4Cl/H_2O$ molar ratio in the reaction environment is maintained above about 0.03. If the ratio falls below requirements the amount of MgO in the product, after decomposition in the calciner 20 rises as shown in FIG. 3, which illustrates the effect of $NH_4Cl:H_2O$ molar ratio in the reacting solution on the level of MgO in the calcined $MgCl_2$ product. In FIG. 3, the solid black squares represent operation with a feed of magnesium chloride dihydrate in methanol, while the open circles represent operation with a feed of magnesium chloride hexahydrate in methanol.

In general, many methods to save thermal energy, as known to those skilled in the art, are available especially when the separation processes in stripper 22 are selected. In addition, the use of methanol (with its relatively high partial pressure in the temperature range in which the magnesium chloride hexammoniate is precipitated) enables to extract the heat of ammoniation from crystallizer 14 in a useful way, rather than to dump the heat to a cooling water stream as indicated in FIGS. 1 and 2. Accordingly, the ammoniation reaction can be carried out at the equilibrium temperature, i.e. no cooling is applied to crystallizer 14 and the temperature of the reacting solution is allowed to rise until the heat extracted by the vaporization of methanol from the solution balances the heat supplied by the ammoniation reaction. The amount of methanol thereby extracted is controlled by varying the amount of excess ammonia circulated through the crystallizer in response to deviations of the equilibrium temperature from the desired operating range. The temperature setpoint can be chosen high enough (e.g. 30° to 60° C.) so that the ammonia-saturated methanol required to wash the cake of centrifuge 16 and the methanol that is fed into dissolver 12 (if any) can be obtained by condensing it in a methanol/ammonia stripper, not shown, fed with the ammonia gas stream from the crystallizer, which now acts as a reboiler for this stripper, providing the heat requirements to separate the methanol from the excess ammonia and thereby reducing the heat input requirements to stripper 22. When operating the crystallizer at the higher temperature to recover the methanol, the reaction slurry extracted from the crystallizer will be cooled to the lowest temperature possible (e.g. 10° to 30° C., depending on the temperature of the cooling water available) in order to increase the yield of magnesium chloride hexammoniate. During the cooling time, and for some suitable time thereafter, additional ammonia is bubbled through the slurry before sending the latter to the separating step in centrifuge 16. The heat available from this cooling and ammoniation process can be exchanged to heat up the stream of clear solution going from centrifuge 16 to stripper 22, thereby further reducing the heat input requirements of that unit operation.

Removal of water can be achieved by regular distillation but also by azeotropic distillation as, for example, with ethyl ether as a withdrawing agent. Methods other than distillation can also be used. For example, membrane techniques such as reverse osmosis and pervaporation could be used as alternative separation procedures. With these processes the heating up of the clear solution by the heat exchange mentioned above is beneficial as it increases the solubility level of the salts and thereby it prevents the interference of carry-over crystals or of newly formed solids with the smooth running of the concentration process. Additionally, in some cases it may be convenient to spray dry the concentrated solution to remove most or all of the water and feed the required $NH_4Cl$ and the residual $MgCl_2$ values back to the crystallizer 14 in solid form.

Referring further to the flow diagram of FIG. 2, the system there represented for continuous operation includes a solid-liquid separation step 28 for controlling the build up of insolubles from the discharge from the stripper 22, and an ammonia separator 30 between the stripper gas outlet and the blower 15 for controlling the build up of inert gases in the gaseous ammonia stream. FIG. 2 also indicates the addition of make-up ammonia at 32, the addition of make-up methanol at 34, and the addition of make-up ammonium chloride at 36, as required to maintain the mass balance in a steady state.

A third alternative embodiment of the invention, when the raw material is a concentrated pure brine (i.e., a solution of $MgCl_2$ in water that has been subjected to chemical and/or physical pretreatments to remove the unwanted impurities), is represented by a modification to the process flow diagram of FIG. 2, where the dissolver 12 and the separation step 12a are eliminated and the brine is fed directly from a brine tank (as in 10 of FIG. 1) to the crystallizer 14. In this case the stream of very low boiling point alcohol going to the dissolver 12 can be completely eliminated, and the very low boiling point alcohol requirements of the crystallizer can be provided directly with the ammonia-saturated very low boiling point alcohol from the top of stripper 22 (in addition to the cake wash solution).

An alternative way of providing ammonium chloride values, rather than by "recycling" in the crystallizer, because the ammonium chloride may be valuable for other processes, is to feed directly into the crystallizer appropriate amounts of hydrochloric acid in the form of hydrogen chloride gas or aqueous acid.

The invention provides a novel way (involving use of an alcohol solution, preferably methanol, but also ethanol, and others and mixtures of alcohols having an atmospheric boiling point below 100° C.) to obtain a suitable $NH_3/H_2O$ molecular ratio at room temperature (or slightly above) and atmospheric pressure (or slightly above), and thereby to avoid the need of cryogenics or high pressures as in procedures heretofore known or proposed. The ammoniation reaction is therefore simply performed and controlled; no pressure vessels are required and hence large and/or multiple process vessels can be used as may be required to produce crystals of uniformly large size. The heat of reaction can conveniently be carried away by cooling water recirculated to and from a cooling tower, for example, or put to good use in the separation of the clear solution into its individual components as outlined above.

It is also found that with the process of the invention the yield of $MgCl_2$ can be from 90% to essentially 100% range as compared with 60% to 75% range as in the prior art. This result affords a significant advantage in productivity, because in prior techniques about 50% of the $MgCl_2$ being processed is coming from the recycle loop, while in the present process only a small fraction is returned to the process. As a consequence the molar ratio of $NH_3$ to anhydrous $MgCl_2$ produced goes down from 25–30 (in prior processes) to 10–15 (in the present invention). As the ammonia needs to be evaporated to be recycled to the process, a major advantage in heat requirements is obtained.

By way of further illustration of the invention, reference may be made to the following examples of operation embodying the present process in comparison with a known process:

EXAMPLE 1

Magnesium chloride dihydrate was dissolved in methanol to form a stock solution consisting of 10% $MgCl_2$, 3.9% $H_2O$, 0.8% $NH_4Cl$ and 85% $CH_3OH$. This stock solution was fed continuously at a rate of 2.5 g/min for a period of 50 min. to a stirred reactor which contained a methanol solution saturated with 13.5% $NH_3$ and containing 5% $H_2O$, 3.3% $NH_4Cl$ and 75.1% $CH_3OH$. During the reaction $NH_3$ was continuously bubbled through the reactor and the temperature was maintained constant at 22° C. The slurry obtained was filtered, washed with a $NH_3$-saturated methanol solution and calcined at 550° C. for 1 hour. An anhydrous $MgCl_2$ product containing 0.1% MgO was obtained. The filtrate solution contained less than 0.01% $MgCl_2$, 13.9% $NH_3$, and 3.9% $H_2O$. The amount of ammonia required in this run was 14 moles of $NH_3$ per mole of $MgCl_2$ produced. The yield was 95.7%.

EXAMPLE 2

Magnesium chloride hexahydrate was dissolved in methanol to form a stock solution consisting of 8.4% $MgCl_2$, 9.6% $H_2O$, 1.1% $NH_4Cl$ and 80.9% $CH_3OH$. This stock solution was fed continuously at a rate of 2.4 g/min for a period of 99 min. to a stirred reactor which contained a methanol solution saturated with 16.7% $NH_3$ and containing 9.6% $H_2O$, 1.1% $NH_4Cl$, and 72.6% $CH_3OH$. During the reaction $NH_3$ was continuously bubbled through the reactor and the temperature was maintained constant at 23° C. The slurry obtained was filtered, washed with a $NH_3$-saturated methanol solution and calcined at 600° C. for 15 minutes. An anhydrous $MgCl_2$ product containing 0.3% MgO was obtained. The filtrate solution contained less than 0.08% $MgCl_2$, 15% $NH_3$, and 8.4% $H_2O$, 1.1% $NH_4Cl$ and 75.5% $CH_3OH$. The yield was 98.3%.

EXAMPLE 3

Magnesium chloride hexahydrate was dissolved in methanol to form a stock solution consisting of 19% $MgCl_2$, 22% $H_2O$, no $NH_4Cl$ and 59% $CH_3OH$. This stock solution was fed continuously at a rate of 2.6 g/min for a period of 56 min. to a stirred reactor which contained a methanol solution saturated with 21.2% $NH_3$ and containing 20.8% $H_2O$, 3.1% $NH_4Cl$, and 55% $CH_3OH$. During the reaction $NH_3$ was continuously bubbled through the reactor. $NH_4Cl$ was fed continuously with a solution of composition 25.1% $H_2O$, 7.3% $NH_4Cl$, 67.6% $CH_3OH$ flowing at a rate of 1.22 g/min in order to maintain a molar ratio of $NH_4Cl$ to $H_2O$ of 0.04 to 0.05 continuously. The temperature was maintained constant at 23° C. The slurry obtained was then filtered, washed with a $NH_3$-saturated methanol solution and calcined at 600° C. for 15 minutes. An anhydrous $MgCl_2$ product containing 0.33% MgO was obtained. The yield was 93%.

COMPARATIVE EXAMPLE 1

This example is a demonstration of a known process (the "Dow Process," U.S Pat. No. 3,092,450) carried out at ambient temperature. Magnesium chloride hexahydrate was dissolved in water to form a stock solution consisting of 24.0% MgCl$_2$, 72.0% H$_2$O, 4% NH$_4$Cl and no CH$_3$OH. This stock solution was fed continuously at a rate of 2.8 g/min for a period of 60 min. to a stirred reactor which contained an aqueous solution saturated with 30.5% NH$_3$ and containing 63.8% H$_2$O and 5.7% NH$_4$Cl. During the reaction NH$_3$ was continuously bubbled through the reactor and the temperature was maintained constant at 23° C. No precipitation occurred.

COMPARATIVE EXAMPLE 2

This example is a demonstration of the Dow Process carried out at low temperature. Example 4 was repeated but in this example the temperature was decreased to 3° C. while adding NH$_3$ to keep the solution saturated with respect to NH$_3$. The slurry obtained was filtered, washed with a NH$_3$-saturated methanol solution and calcined at 600° C. for 15 minutes. An anhydrous MgCl$_2$ product containing 1.3% MgO was obtained. The yield was 62%.

It is to be understood that the invention is not limited to the procedures and embodiments hereinabove specifically set forth, but may be carried out in other ways without departure from its spirit.

What is claimed is:

1. A process for obtaining anhydrous magnesium chloride, as a product, from a hydrated magnesium chloride, comprising
   (a) establishing a solution of hydrated magnesium chloride;
   (b) reacting said solution of hydrated magnesium chloride at substantially ambient pressure and at a temperature between 10° and 60° with a mixture containing ammonium chloride and ammonia saturated alcohol, said alcohol having a boiling point of 100° C. or less to form a precipitate of ammoniated magnesium chloride;
   (c) separating the precipitate of ammoniated magnesium chloride; and
   (d) decomposing the separated precipitate into anhydrous magnesium chloride, as said product, and ammonia.

2. A process according to claim 1, wherein step (a) comprises establishing a solution of hydrated magnesium chloride in water.

3. A process according to claim 1, wherein step (a) comprises establishing a solution of hydrated magnesium chloride in alcohol having a boiling point of 100° C. or less.

4. A process according to claim 1, including the step of recycling ammonia, ammonium chloride, and alcohol from steps (c) and (d) for performance of steps (a) and (b) with fresh quantities of hydrated magnesium chloride, and wherein water of hydration from said hydrated magnesium chloride is separated and removed incident to the recycling step.

5. A process according to claim 1, wherein said alcohol is methanol or ethanol.

6. A process according to claim 5, wherein said alcohol is methanol.

7. A process according to claim 1, wherein the hydrated magnesium chloride is MgCl$_2$.nH$_2$O, where n is less than 6.

8. A process according to claim 7, wherein the hydrated magnesium chloride is magnesium chloride dihydrate.

9. A process according to claim 8, further including the step of obtaining said dihydrate from material containing magnesium chloride hexahydrate by heating said material to partially drive off water of hydration of said hexahydrate.

10. A process according to claim 9, wherein step (a) comprises dissolving the dihydrate in alcohol having a boiling point of 100° C. or less, wherein said material contains impurities insoluble in the alcohol, said impurities being introduced with the hydrated magnesium chloride to the solution established in step (a), and wherein step (a) further includes removing said insoluble impurities from said solution.

11. A process according to claim 1, wherein, at least in step (b), the mixture contains water, and wherein ammonium chloride is present in the mixture in step (b) in an amount at least sufficient to inhibit formation of magnesium hydroxide by reaction of magnesium chloride in the mixture with the water and the ammonia therein.

12. A process according to claim 11, wherein the NH$_4$Cl/H$_2$O molar ratio in the mixture in step (b) is maintained above about 0.03.

13. A process according to claim 1, wherein the ammonia produced in step (d) is recycled for use in step (b).

14. A process according to claim 1, wherein the ammonium chloride in the solution mixture in step (b) is supplied thereto with the solution established in step (a), and wherein step (a) further includes incorporating ammonium chloride in the solution therein established.

15. A process for making anhydrous magnesium chloride, comprising, in combination:
   (a) drying impure salt containing hydrated magnesium chloride while maintaining the magnesium chloride at least partially hydrated;
   (b) dissolving the dried salt in an alcohol having a boiling point of 100° C. or less together with ammonium chloride, to establish a magnesium salt solution containing the at least partially hydrated magnesium chloride;
   (c) removing insoluble impurities from said magnesium salt solution containing the at least partially hydrated magnesium chloride;
   (d) reacting said solution containing the at least partially hydrated magnesium chloride at substantially ambient pressure and at a temperature between 10° and 60° with a mixture containing ammonium chloride and ammonia saturated alcohol, said alcohol having a boiling point of 100° C. or less to form a precipitate of ammoniated magnesium chloride;
   (e) separating the precipitate of ammoniated magnesium chloride; and
   (f) heating the separated precipitate to obtain anhydrous MgCl$_2$ and ammonia for recycling.

16. A process according to claim 15, wherein said alcohol is methanol or ethanol.

17. A process according to claim 16, wherein said alcohol is methanol.

18. A process according to claim 1, wherein the source of magnesium chloride for step (a) is raw material selected from the group consisting of natural and artificial MgCl$_2$ brines, bischofite (MgCl$_2$.6H$_2$O), carnallite (KCl.MgCl$_2$.6H$_2$O), ammonium carnallite (NH$_4$Cl.MgCl$_2$.6H$_2$O), and any other magnesium chloride containing material.

* * * * *